United States Patent [19]

Kotzin et al.

[11] Patent Number: 5,604,787
[45] Date of Patent: Feb. 18, 1997

[54] METHOD AND APPARATUS FOR TRANSFERRING INFORMATION TO A DEVICE IN A COMMUNICATION SYSTEM

[75] Inventors: Michael D. Kotzin, Buffalo Grove; Jeffrey D. Bonta, Arlington Heights, both of Ill.

[73] Assignee: Motorola, Inc., Schaumburg, Ill.

[21] Appl. No.: 320,017

[22] Filed: Oct. 7, 1994

[51] Int. Cl.⁶ .................................................. H04Q 7/32
[52] U.S. Cl. ............................................ 379/58; 379/357
[58] Field of Search ................................. 379/58, 59, 61, 379/62, 91, 357, 144, 131, 192; 340/825.34, 825.44, 825.33; 364/130, 140, 141, 143, 145; 235/380

[56] References Cited

U.S. PATENT DOCUMENTS

| | | |
|---|---|---|
| 5,029,233 | 7/1991 | Metroka . |
| 5,138,650 | 8/1992 | Stahl et al. ............................ 379/91 X |
| 5,249,302 | 9/1993 | Metroka et al. . |
| 5,301,234 | 4/1994 | Mazziotto et al. .................... 379/59 X |
| 5,325,429 | 6/1994 | Kurgan . |
| 5,371,493 | 12/1994 | Sharpe et al. ...................... 340/825.34 |
| 5,412,726 | 5/1995 | Nevoux et al. ....................... 379/91 X |
| 5,418,837 | 5/1995 | Johanson et al. ......................... 379/58 |
| 5,438,612 | 8/1995 | Norimatsu .................................. 379/58 |

Primary Examiner—Curtis Kuntz
Assistant Examiner—Michael B. Chernoff
Attorney, Agent, or Firm—Randall S. Vaas; Richard A. Sonnentag

[57] ABSTRACT

A smart card (100) is equipped with an internal time-of-day clock and calendar (106). Between the smart card (100) and a subscriber unit (209, 300), into which it is inserted, there is a communication of the subscriber's identity and a negotiated agreement for how long the subscriber unit (209, 300) is to maintain the transferred identity. For that duration of time, the subscriber unit (209, 300) is enabled with the subscriber's identity, and the smart card is essentially "dumb," and therefore unusable until that duration has elapsed.

9 Claims, 4 Drawing Sheets

5,604,787

METHOD AND APPARATUS FOR TRANSFERRING INFORMATION TO A DEVICE IN A COMMUNICATION SYSTEM

FIELD OF THE INVENTION

The present invention relates generally to subscriber units utilized in communication systems and, in particular, to transfer of information to subscriber units utilized in such communication systems.

BACKGROUND OF THE INVENTION

Communications systems, and more particularly cellular radiotelephone systems such as the Global System for Mobile Communications (GSM) Digital Cellular System, are known to include a variety of services that each cellular user can subscribe to for a fee. The information regarding the identity of each user (subscriber identity) and the services that he/she subscribes to are maintained in a centralized database, for example a Home Location Register (HLR) in GSM. Each cellular provider may have one or more of its own HLRs, however, the information specific to each cellular user is contained in only one HLR. As users travel between different geographical areas, key portions of this information are transferred upon request to a local database, for example a Visited Location Register (VLR) in GSM. Each subscriber unit also contains the subscriber identity that identifies a particular user. Each time a user attempts to place a cellular phone call, the subscriber identity and the services being requested are communicated between the subscriber unit and the local VLR via the radiotelephone network. It is the responsibility of the VLR to validate the subscriber's request against subscription services that were previously arranged. This may require the VLR to request a transfer of subscription services from the subscriber's HLR. If the subscriber can be identified as a valid subscriber of the requested services, then the setup of the phone call is permitted to continue.

As is also known, each subscriber unit has a unique equipment number associated with it. Early cellular radiotelephone systems required that the subscriber only be permitted to use one radio to place phone calls. Therefore, a verification was performed to ensure that the equipment number matched the subscriber identity. This coupling of the equipment number with the subscriber identity was intended to limit fraud by preventing the same subscriber identity from being replicated. More mature radiotelephone systems (such as the GSM system) now offer the user the flexibility of transferring the subscriber identity from one radiotelephone unit to another using "smart card" technology. Additional security measures were implemented that require authentication of the subscriber identity, thus preventing the fraud of replication. Therefore, in mature radiotelephone systems such as GSM, the equipment number is not required to match the subscriber identity for fraud prevention purposes.

Current smart cards are small and lightweight (i.e. similar to a credit card), and, as the name implies, contain a computer and memory enabling subscriber information to be transferred from the smart card to the subscriber unit. As long as the smart card is inserted in the subscriber unit, the subscriber is able to communicate the subscriber identity and requested service to the radiotelephone network for validation when the subscriber desires to place a phone call. Unfortunately, the requirement for the smart card to be inserted in the subscriber unit in order to complete a phone call provides significant opportunity for the smart card to be forgotten and left in the subscriber unit. If forgotten in the subscriber unit, the above precautions taken for fraud prevention become moot if the subscriber unit ends up in the hands of an undesired user.

To the average consumer, radiotelephone services (such as cellular) offer desired services that can be expensive if more than one subscriber identity is required. The current methods described above to prevent fraud can be considered too inflexible to permit cooperating consumers to share a subscriber identity. For example, two cooperating consumers having different requirements for the time of usage of a subscriber identity could maximize the use of the subscriber identity by sharing it using a prearranged schedule. The current fraud prevention techniques prohibit efficient use of the subscriber identity.

Therefore, a need exists for a method and apparatus to temporarily transfer the subscriber identity from a subscriber unit, such as a Smart Card, to another subscriber unit, such as a radiotelephone unit, as well as a negotiated agreement for how long the receiving subscriber unit would keep the transferred subscriber identity. For that duration of time, the receiving subscriber unit would become enabled with the subscriber identity while the transmitting subscriber unit (e.g. Smart Card) would become unusable for that duration of time. Further, such a method and apparatus would permit activation times that were not immediate nor contiguous.

DETAILED DESCRIPTION OF A PREFERRED EMBODIMENT

A smart card 100 is equipped with an internal time-of-day clock and calendar 106. Between the smart card 100 and a device (subscriber unit 209, 300), into which it is inserted, there is a communication of the subscriber's identity and a negotiated agreement for how long the subscriber unit 209, 300 is to maintain the transferred identity. For that duration of time, the subscriber unit 209, 300 is enabled with the subscriber's identity, and the smart card is essentially "dumb," and therefore unusable until that duration has elapsed. This feature prevents the problem of simultaneous use and duplicated identifies.

In general terms, a method of transferring information to a device comprises the steps of providing the information to the device and allowing the device to utilize the information for a predetermined time period. The information can be related to, inter alia, the device's ability to access the communication system in which the device is utilizing, and to the device's identity. In the preferred embodiment, the information is provided by a smart card having an internal clock or timer, but in alternate embodiments the information may be provided by either a wireless link or a wired link. In the alternate embodiment scenario, the information may be further provided via keypad entry, voice-activated entry, or any other convenient form of entry.

In the preferred embodiment, the step of providing the information is performed by the smart card, which keeps track of the number of units (minutes) utilized, and when the use is scheduled. In one embodiment, the smart card could provide the device with time immediately; in an alternate embodiment, the smart card could provide the device with time reserved for use in the future. In still another embodiment, the subscriber utilizing smart card 100 could manually set when the device should become active. In the preferred embodiment, the device is a subscriber unit 209, 300 utilized in a cellular radiotelephone system. As one of ordinary skill in the art will appreciate, however, the concept of transferring information to a device as herein described and claimed is applicable to any scenario and devices where common information is desired to be shared.

Figure 1:
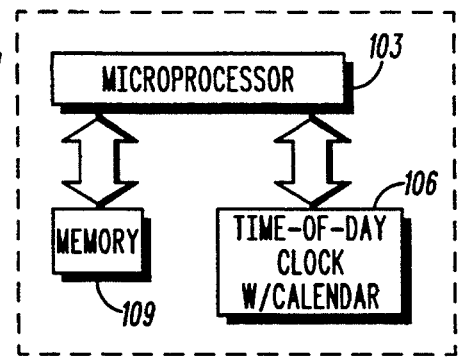
FIG. 1 generally depicts a smart card having a time-of-day clock and calendar in accordance with the invention.

FIG. 1 generally depicts a smart card 100 having an internal clock or timer in accordance with the invention. As depicted in FIG. 1, a microprocessor 103 is coupled to both a time-of-day clock with a calendar 106 and is also coupled to a memory 109. In the preferred embodiment, microprocessor 103 is a MC6805 with built in memory 109.

Figure 2:
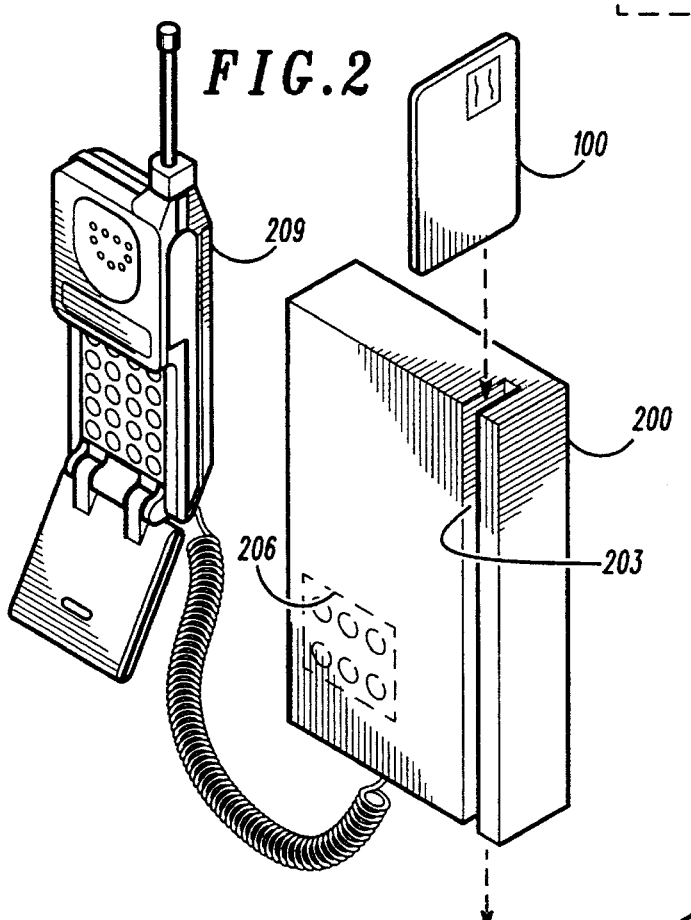
FIG. 2 generally depicts a subscriber unit having a swipe slot to accept a smart card utilized to activate a subscriber unit in accordance with the invention.

FIG. 2 generally depicts a smart card 100 utilized to activate a subscriber unit in accordance with the invention. As depicted in FIG. 2, a swipe card reader 200 having a swipe slot 203 is utilized to transfer information provided by smart card 100 into a subscriber unit 209. While many different techniques of information transfer exist, in the preferred embodiment the smart card 100 transfers a block of units, N, (or any remaining time, RT) to the subscriber unit 109 for each swipe through swipe slot 203. In other words, if the block of time N is equal to 15 minutes, subscriber unit 109 would receive 15 minutes of usage for each time smart card 100 is swiped through swipe slot 203. In one embodiment, subscriber unit 209 (or swipe card reader 200) could display the current time remaining for having the use of the subscriber unit's identity. Then, if the subscriber is in the middle of a call and recognizes that the allotted time has almost elapsed, the subscriber could swipe again to increase the time remaining.

Also shown in FIG. 2 are function keys 206 residing on swipe card reader 200. An example of one of the keys would be a "DUMP" key which would manually flush the subscriber's identity from subscriber unit 209 (this action does not enable smart card 100). This would be utilized when the subscriber no longer needs the use of subscriber unit 209 and wishes to ensure that no one else may use unit 209. Of course, subscriber unit would become inactive after the allotted time has elapsed (the same time smart card 100 would reactivate). If a subscriber wished to credit the smart card 100 with any time remaining, one of keys 206 could be a "CREDIT" key which would be pressed, smart card 100 swiped through swipe insert 203, and any time remaining on subscriber unit 209 would be transferred back to smart card 100. This feature would in a sense "extract" back the identity from subscriber unit 209 to the smart card 100, and allow smart card 100 to be reactivated immediately if so desired.

Figure 3:
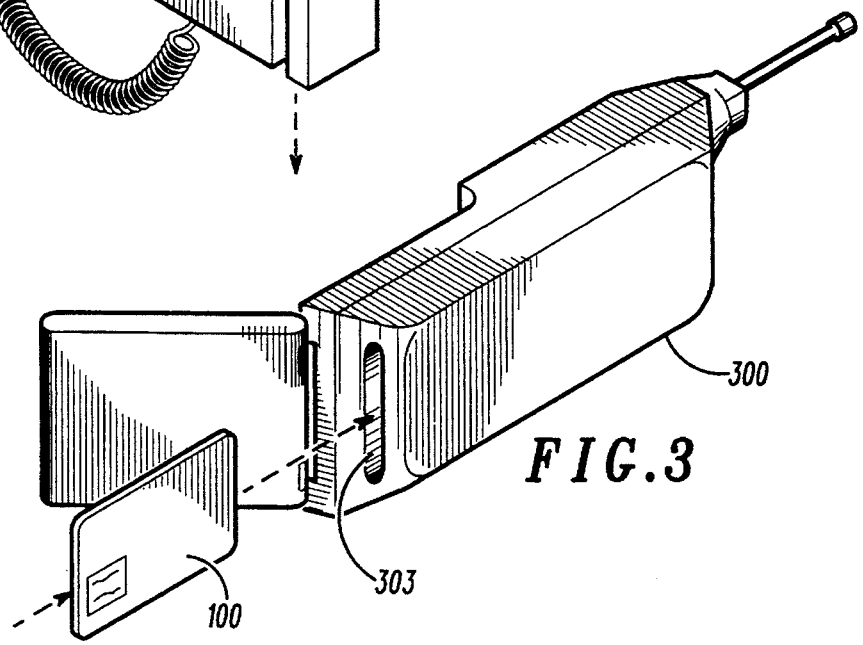
FIG. 3 generally depicts a subscriber unit having an insert slot to accept a smart card utilized to activate a subscriber unit in accordance with the invention.

FIG. 3 generally depicts a subscriber unit 300 having an insert slot 300 to accept smart card 100 having time-of-day clock with calendar in accordance with the invention. An example of an apparatus for accepting and retaining an smart card can be found in U.S. Pat. No, 5,325,429, having as an inventor Jeffrey F. Kurgan, patented 28 Jun. 1994, having as assignee the assignee of the present invention, and incorporated herein by reference. In this embodiment, when smart card 100 is inserted into subscriber unit 300 via slot 303, the subscriber unit itself might ask for the length of time the device is to hold the subscriber unit's identity. When prompted as such, a subscriber could then insert the number of minutes through the keypad (not shown) on the front of subscriber unit 300. The protocol between the subscriber unit and the smart card 100 would then negotiate the proper transfer of time. For the duration that the subscriber has requested, the subscriber unit 300 would be enabled with the subscriber unit's identity, while the smart card 100 would essentially "go dumb" until that duration has elapsed.

Important to note is that any negotiated activation time need not be immediate, nor necessarily contiguous. For example, a subscriber may program a subscriber unit to go active for a certain period (or periods) in the future. At the programmed starting times, the subscriber unit 300 would be enabled, and the smart card 100 would inactivate for the programmed duration of time. While the embodiments described in FIG. 2 and FIG. 3 have the programming via the subscriber unit 209 and 300, these embodiments are purely for convenience as each subscriber unit 209, 300 have keypad entry means built therein. As one of ordinary skill in the art will appreciate, the complexity of the subscriber units 209, 300 can be lessened if the smart card itself is capable of being programmed via a keypad on the smart card 100 itself, so that no programming via the subscriber units 209, 300 need take place.

Figure 4:
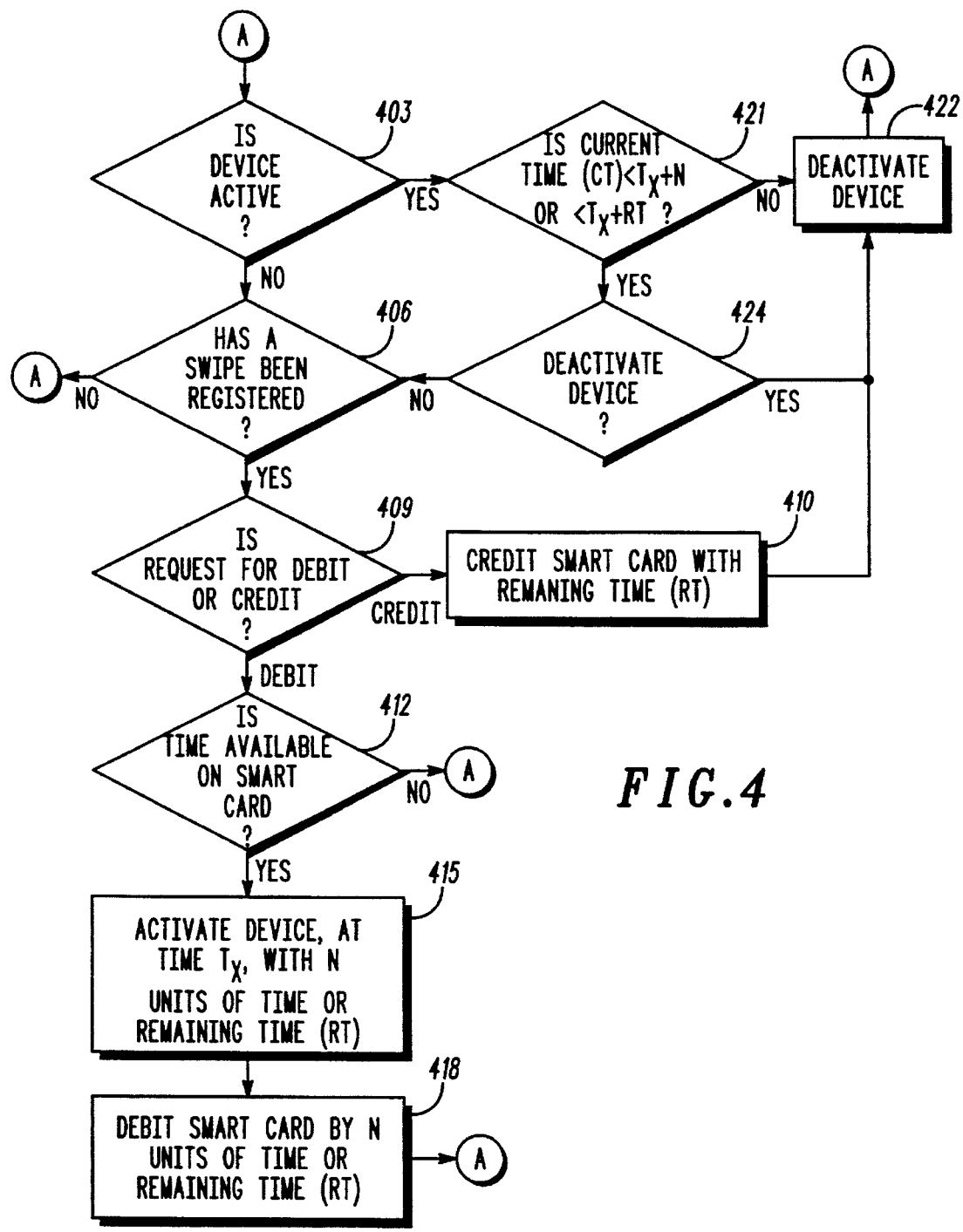
FIG. 4 generally depicts, in flow diagram form, the steps taken by a subscriber to activate the subscriber unit of FIG. 2 in accordance with the invention.

FIG. 4 generally depicts, in flow diagram form, the steps a subscriber would undergo to activate a subscriber unit 209 in the swipe configuration shown in FIG. 2. The process starts at block 403 where a check is made to determine if the device is active. If no, a check 406 is made to determine if a swipe has been registered. If a swipe has been registered, a check 409 is made to determine if the swipe is for a debit or a credit 409. A request for a debit or a credit would be made by the subscriber via a "DEBIT" or "CREDIT" key via keys 206. Continuing, if the request is for a debit (i.e., the subscriber wishes to extract the user identity from smart card 100 into subscriber unit 209), a check 412 is made to determine the time available on smart card 100. If time is available, the device is activated 415, at time Tx (the current time) with N units of time (where N may be predetermined or input by the subscriber) or with any remaining time (RT) remaining on smart card 100. After the device has been activated, the smart card 100 is debited 418 by the N units of time or the remaining time (RT). The process then goes back to block 403 where a check to determine if the device is active is made.

If at block 403 the device is determined to be active, a check is made at block 421 to determine if the current time (CT) is less than Tx+N or less than Tx+RT. In other words, a check is made to determine if the N units or the RT remaining time has expired. If the current time is greater than the N units or RT remaining time, the allotted time has expired and process proceeds to block 422 which deactivates the device. At this point, block 403 is repeated. If, however, the allotted time has not expired at block 421, a check 424 is made to determine if the subscriber wishes to deactivate the device. If yes, the process proceeds to block 422 where the device is deactivated. If the subscriber does not wish to deactivate the device, a check 406 is made to determine if another swipe has been registered and flow proceeds as described above. Finally, if the request 409 is for a credit, process proceeds to block 410 where the smart card is credited with any remaining time. Process then proceeds to deactivate device at 412 and again the entire process is initiated at block 403 to determine whether the device is active.

Figure 5:
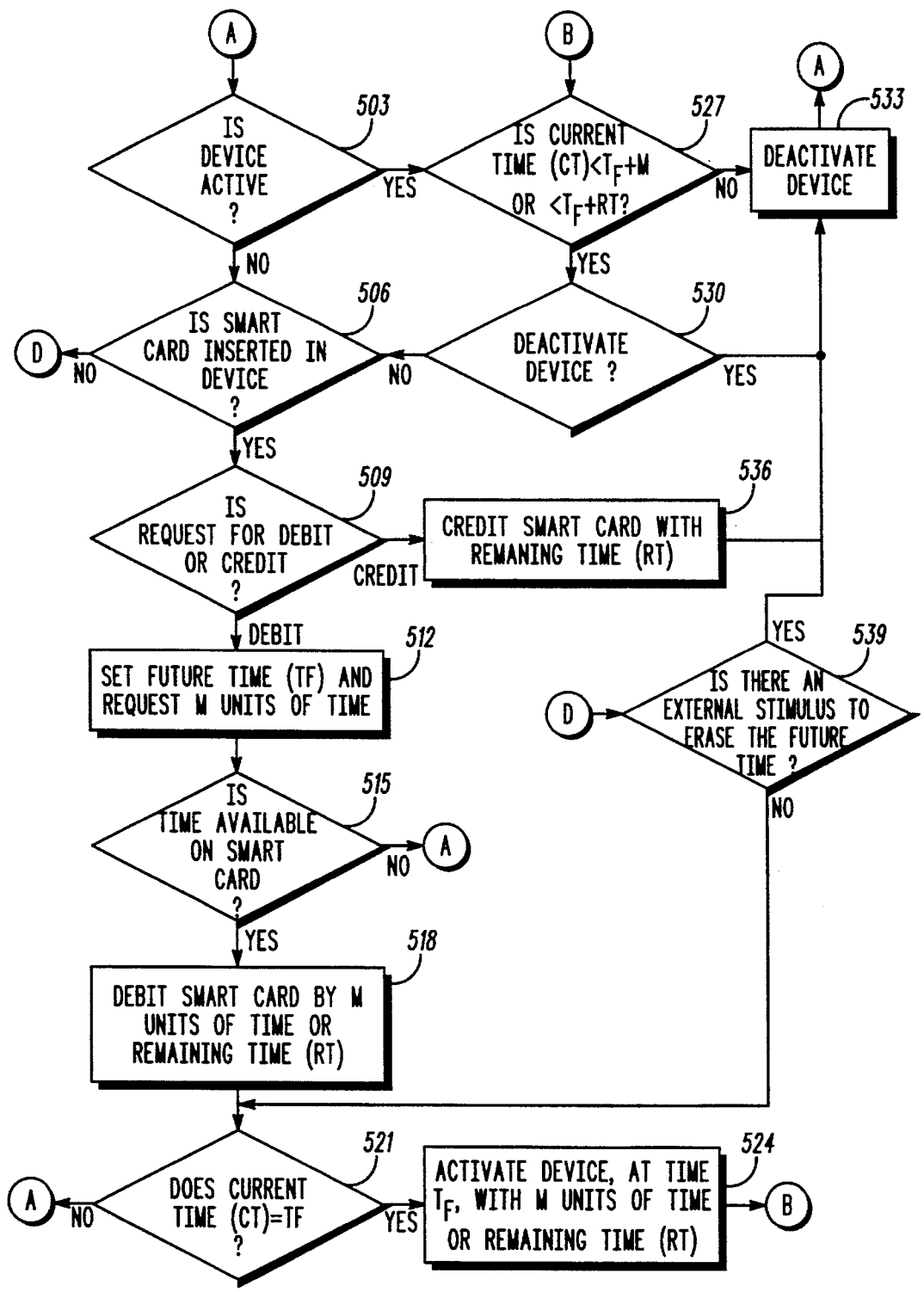
FIG. 5 generally depicts, in flow diagram form, the steps taken by a subscriber to activate the device of FIG. 3 in accordance with the invention.

FIG. 5 generally depicts, in flow diagram form, the steps taken by a subscriber to activate the device of FIG. 3 in accordance with the invention. The process starts at block 503 where a check is made to determine if the device is active. If no, a check is made 506 to determine if the smart card is inserted in the device. In the preferred embodiment, the device is a subscriber unit as depicted in FIG. 3, but may be any communication unit suitable for use with smart card 100. Continuing, if the smart card is inserted in the device, a check is made 509 to determine if the subscriber requests a debit or credit. If the request if for a debit (i.e., the subscriber wishes to extract the user identity from smart card 100 and input that identity into subscriber unit 300), the future time (Tf) is set in a request for M units of time is made at block 512. A check is then made 515 to determine if time is available on smart card 100. If no time is available, the process proceeds to block 503. If time is available on smart card 100, smart card 100 is debited by the M units of time or RT remaining units of time at block 518. Process then proceeds to block 521 where a check is made to determine if the current time (CT) is equal to the future time (Tf) that was set at block 512. Future time (Tf) may represent the current time (CT) or may represent a time that is programmed for future use. Consequently, if the current time does not equal the future time (Tf), process proceeds to block 503. On the contrary, if the current time is equal to the future time (Tf), (i.e., future time being the programmed time), the device is activated 524 with M units of time or RT remaining units of time, whichever was debited at block 518.

At this point, the device is active and as such, needs to be monitored for expiration of the elapsable time. Consequently, after the device is activated at block 524, and if the device is active at block 503, a check is made to determine if the current time is less than Tf+M or if the current time is less than Tf+RT. If yes, the device is still active and process proceeds to block 530 where a check is made to determine if the subscriber wishes to deactivate the device. If no, process proceeds to block 506 where a check is made to determine if the smart card 100 is inserted in the device. At this point, if the smart card 100 is not inserted in the device 300, process proceeds to block 539 where check is made to determine if there is an external stimulus to erase the future time. The external stimulus may be affected through a subscriber input via the keypad of device 300, but may likewise be a stimulus from a base-station (not shown) of the cellular radiotelephone system. Continuing, if no external stimulus is present, process proceeds to block 521 as described above. If there is an external stimulus to erase the future time, process proceeds to block 533 where the device is entirely deactivated. Deactivation of the device erases the future time that had been previously stored in device 300.

Returning to block 527, if the current time is greater than Tf +M or is greater than Tf+RT, the elapsable time has elapsed and the device must now be deactivated. Consequently, process then proceeds to block 533 where the device is deactivated. If, at block 509, the request is for a credit of time, process from block 509 proceeds to block 536 where the smart card 100 is credited with any remaining time RT unused by the subscriber for this programming period. At this point, process proceeds to block 533 where the device is deactivated. Output from block 533 proceeds to block 503 where, a check is made to determine if the device is active and the entire process is repeated.

Figure 6:
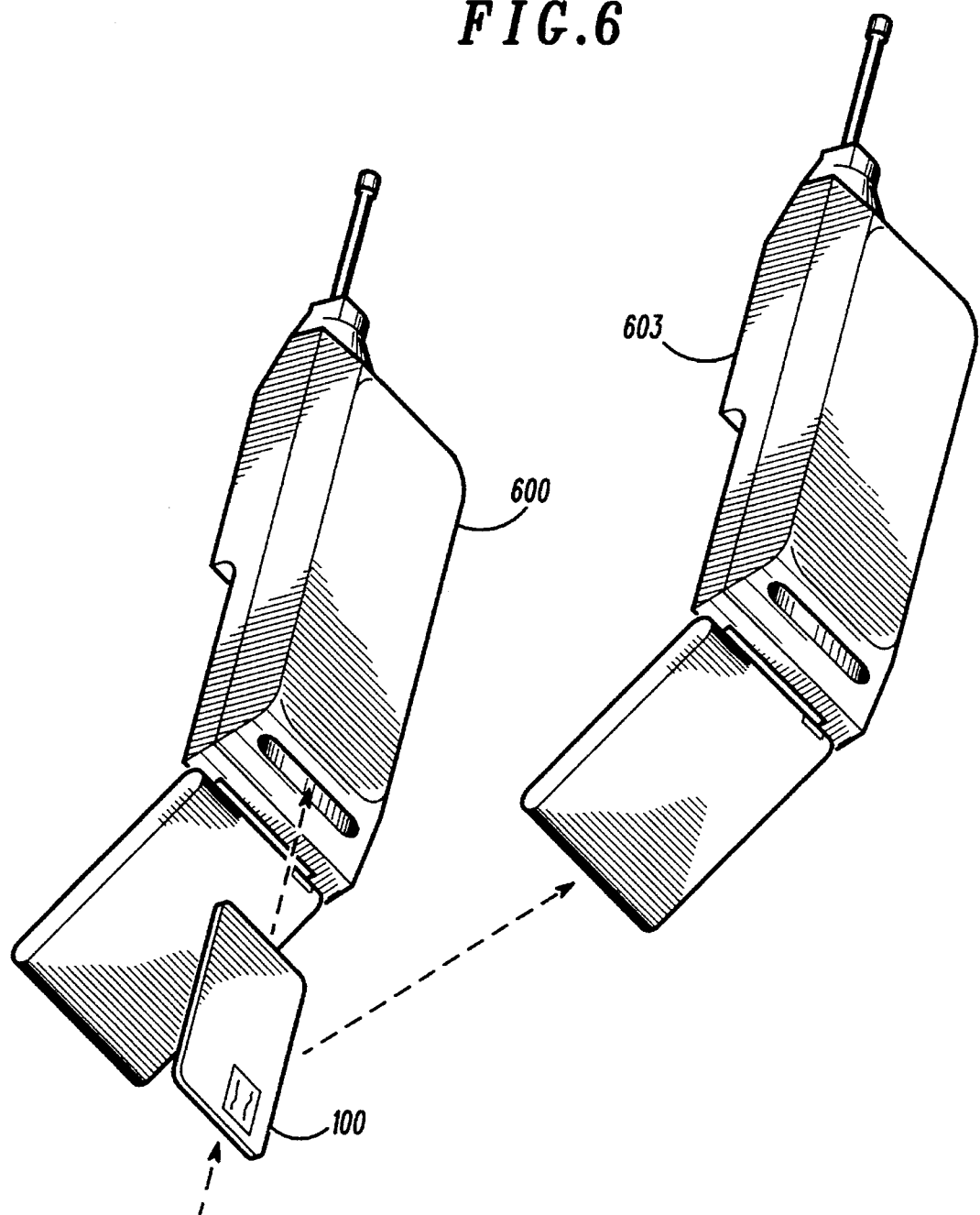
FIG. 6 depicts a beneficial implementation of a smart card having a time-of-day clock and calendar in accordance with the invention.

FIG. 6 depicts a beneficial implementation of smart card 100 with time-of-day clock and calendar 106 in accordance with the invention. As shown in FIG. 6, information related to a subscriber unit's identity is supplied to a plurality of subscriber units 600, 603. Smart card 100 provides the identity information to a first subscriber unit 600. The information may be provided to subscriber unit 600 for a first time period, which may be any time period desirable by the subscriber. Smart card 100 is then inserted into a second subscriber unit 603 so that the identity information may be supplied to subscriber unit 603 for a time period not common with the first time period. In other words, once subscriber unit 600 has been programmed for the first time period, subscriber unit 603 may be programmed for any other time period so long as that programmed time period does not overlap with the first time period programmed into first subscriber unit 600.

While two subscriber units have been depicted in FIG. 6, more than two may obviously be programmed at any one time. The only requirement in programming more than two subscriber units is that no time overlap during programming may exist. Smart card 100 ensures that programming overlap does not occur by keeping track of all programmed time, and not allowing any time overlap to occur. In other words, if a second subscriber unit attempted to program for time which overlapped with time programmed in a first subscriber unit, smart card 100 could be setup so that either, inter alia, no programming is allowed or programming for non-overlapping time is only allowed. With the cooperation of the cellular system operators, it might be desirable and possible to introduce a capability whereby a restricted subscriber unit could place an emergency call.

There may be the need to provide some guard or buffer time in the transfer of ownership of the user identity. This would avoid any problem with clock drifting or allowing any cellular system fraud detection mechanism from tripping, for example, by its noticing that a user skips across town in a matter of seconds. Limitations would also have to be in place to prevent a user from tampering with the time-of-day clock and calendar.

After an identity transfer occurs, it might be useful for the newly enabled radio to register on the system. This would ensure that the system becomes aware of the new location of the active user. An audible beep might warn a user that he about to lose the ownership of the radio's identity and therefore, that his radio is about to become inoperative.

Direct electrical connection is not necessary during the programming of the multiple units. For example, it might be desirable to be able to program the two subscriber units using a phone modem connection. In fact, it is even possible for one of the subscriber units (obviously the one that "owns" the subscriber identity) to be operating over the cellular system during the programming process. All that is necessary is to incorporate adequate security measures such that properly negotiated assignment of operating periods is accomplished. These techniques are fairly well known in the public key literature, including authentication mechanisms, random challenges, and signature verification. For example, a verification algorithm might be utilized to validate acceptance of the assigned times by all the other unit(s) during the time the programming is being negotiated/accomplished. The programming procedure might also include some status setting or checking between the plurality of units, for example, to ensure synchronization of the on-board calendars and clocks. Enough security is possible to guarantee that the simultaneity criterion is unable to be obviated. To prevent fraud, a unique group key might be useful to embed in the subscriber units of a group so that the subscriber unit's electronic serial number (ESN) and phone number are only exchanged between members of the same group.

It may be desirable for the subscriber units 600, 603 to obtain time-of-day information from the infrastructure. This could be received on the control channel when the subscriber unit powers up, and the subscriber unit could keep time thereafter.

As one of ordinary skill in the art will appreciate, many variations of the present invention are available. For example, a plurality of devices may share information amongst themselves by negotiating information for use during a predetermined time period from a source device and negotiating, from the source device, the same information for use during a time period non-overlapping with the predetermined period of time. The source device in this embodiment may comprise a smart card with/without a time-of-day clock and calendar, or any other convenient method of transfer.

What we claim is:

1. A portable smart card, comprising:

a controller;

a memory coupled to the controller; and a time device, wherein the controller controls operation of the smart card, the controller to transfer a secure subscriber unit identity stored in the smart card to a communication device for a time period negotiated by the controller, to control the smart card to make the secure subscriber unit identity not available from the smart card for use by an other device during the negotiated time period, and to make the secure subscriber identity available to the other device during other time periods, whereby the controller automatically prevents transfer of the secure subscriber unit identity to the other device for use during the negotiated time period and the secure subscriber unit identity is automatically made available for transfer from the smart card for use at times other than the negotiated time period.

2. The portable smart card as defined in claim 1, wherein the controller automatically controls the smart card to be unable to transfer the secure subscriber unit identity at the beginning of the negotiated time period and automatically reactivates the smart card to enable transfer of the secure subscriber unit identity at the end of the negotiated time period.

3. The portable smart card as defined in claim 1, wherein the time device provides time and date information, and the controller to transfer the secure subscriber unit identity to a second device for use by the second device at a negotiated time on a particular date, and the controller to automatically prevent secure subscriber unit identity availability during said negotiated time on said particular date.

4. The portable smart card as defined in claim 3, wherein the smart card stores a plurality of negotiated time periods during which the secure subscriber unit identity will not be able to transfer the secure subscriber unit identity.

5. The portable smart card as defined in claim 3, wherein the time device is a time and date clock.

6. The portable smart card as defined in claim 1, wherein the controller is a microprocessor.

7. In combination, a portable radio frequency communication device and a portable subscriber unit identity module, the portable radio frequency communication device comprising a card reader and storing a subscriber unit identity; and the smart card comprising a controller, a memory and a time device, the controller transferring a secure subscriber unit identity to the portable radio frequency device for a time period negotiated between the portable radio frequency device and the controller;

wherein the smart card deactivates secure subscriber unit identity availability during the negotiated time period and allows availability for use during other time periods, and the portable communication device adopts the secure subscriber unit identity at the beginning of the negotiated time period and deletes the secure subscriber unit identity upon the termination of the negotiated time period, whereby the portable radio communication device operates with the secure subscriber unit identity when the card is removed therefrom during the negotiated time period and the secure subscriber unit identity is available for a plurality of devices only one device at a time.

8. A method of temporarily transferring a secure subscriber unit identity from a portable smart card to a communication device for a predetermined time period, the method comprising the steps of:

transferring the secure subscriber unit identity from the smart card to the communication device for a determined time period so that the smart card can be removed from the communication device without the communication device losing the subscriber unit identity during the determined time period;

automatically preventing availability of the secure subscriber unit identity of the smart card for use by an other device during the determined time period and automatically allowing availability after the determined time period; and deleting the subscriber unit identity from the communication device at the end of the determined time period.

9. The method as defined in claim 8, further including the steps of disabling availability of the secure subscriber unit identity from the smart card at the beginning of the determined time period and automatically reactivating the secure subscriber unit identity availability in the smart card at the end of the determined time period.

* * * * *